Sept. 8, 1931. A. JOSEPH 1,822,293
PROCESS FOR REGENERATING CONTAMINATED PURIFYING AGENTS
Original Filed May 14, 1928
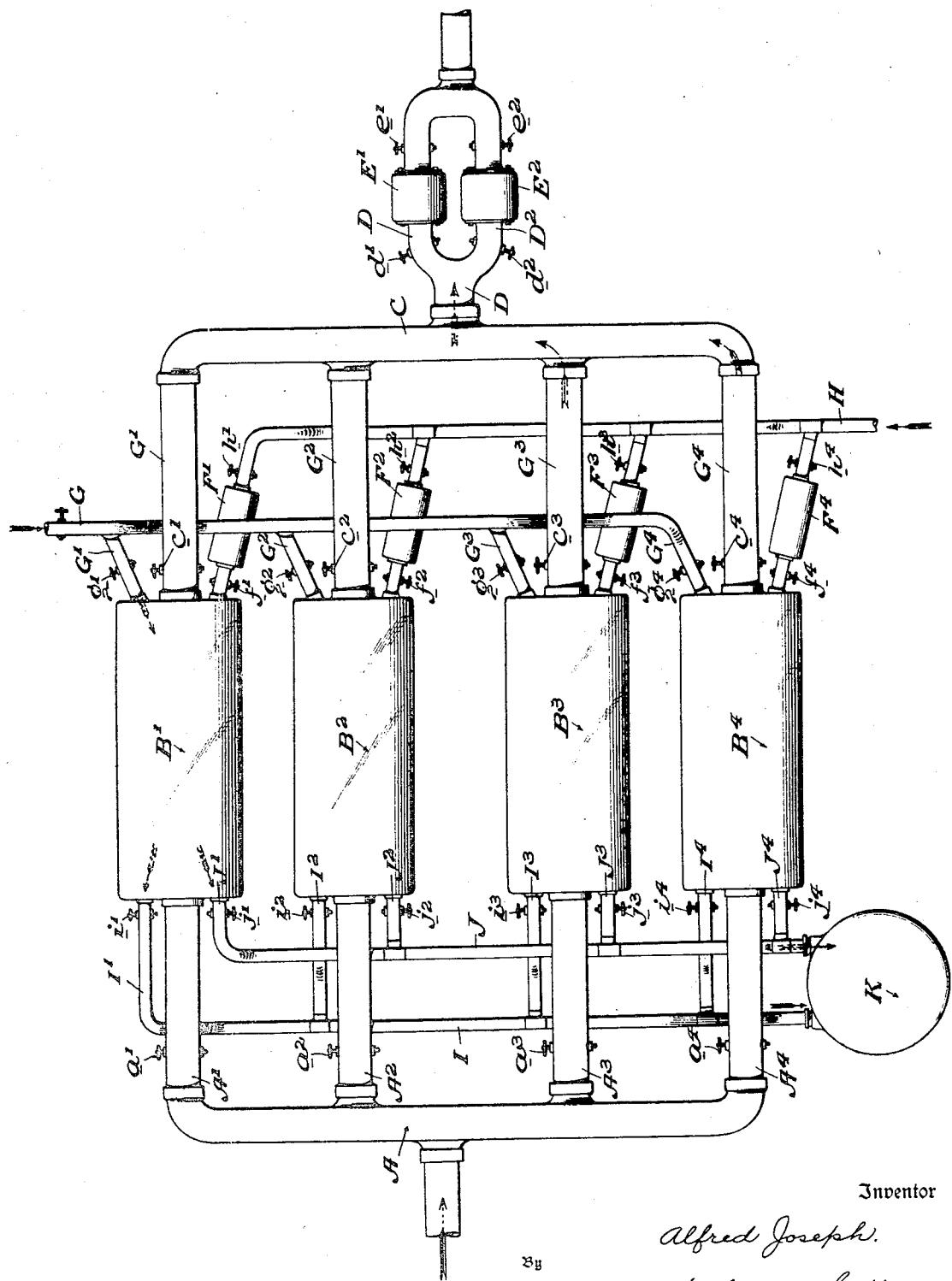
Inventor
Alfred Joseph.
By Cameron, Kerkam & Sutton.
Attorneys

UNITED STATES PATENT OFFICE

ALFRED JOSEPH, OF ENGHEIN, SEINE-ET-OISE, FRANCE, ASSIGNOR TO COMPAGNIE INTERNATIONALE POUR LA FABRICATION DES ESSENCES ET PETROLES, OF PARIS, FRANCE, A LIMITED JOINT STOCK COMPANY OF FRANCE

PROCESS FOR REGENERATING CONTAMINATED PURIFYING AGENTS

Original application filed May 14, 1928, Serial No. 277,735, and in France August 8, 1927. Divided and this application filed January 20, 1931. Serial No. 509,988.

This invention relates to a process for regenerating a spent or contaminated purifying material, and is a division of my application Serial No. 277,735, filed May 14, 1928.

For the hot purification of gases derived from the pyrogenation, distillation, or gasification of carbonaceous materials, with a view to the elimination of sulphur compounds, the employment has already been proposed, in various forms, of metals or oxides capable of combining with the sulphur to give sulphides.

The sulphur compounds existing in the gases may be classed under two categories, one being the mineral sulphur compounds the principal of which is sulphuretted hydrogen ($H_2S$), and the other being the organic sulphur compounds of which the principals are carbon bisulphide ($CS_2$) the mercaptans ($C_2H_5SH$, etc.) and the thiophenes ($C_4H_4S$, etc.).

The sulphuretted hydrogen ($H_2S$) can be eliminated with the aid of metals or metal oxides such as nickel or the oxides of nickel, by the formation of nickel sulphides and the liberation of hydrogen, or the formation of water; the nickel sulphides formed are, in their turn, easily decomposed in order to reform nickel oxides.

As regards the organic sulphur compounds, they can be decomposed by certain metals or oxides. One part of sulphur liberated is fixed by such metals, the other part can disengage in the form of sulphuretted hydrogen, the sulphuretted hydrogen thus formed being retained as above indicated.

In the specification of U. S. patent application No. 100,462, of Eugene Albert Prudhomme, filed April 7, 1926, there is described a process and an apparatus for the elimination of the sulphur in the operative cycle of transforming into light hydrocarbons gases derived either from a combustible or from a heavy hydrocarbon. The process consists in treating the gases in three purifying apparatuses in series wherein the first has the function of retaining almost the whole of the sulphuretted hydrogen, the second liberates, then retains a part of the sulphur contained in the organic sulphur compounds, and the third retains the sulphuretted hydrogen which may form in the second.

The regeneration of the purifiers, in industrial plants, must take place periodically at intervals of time, of the order of one or several hours, and which vary with the starting material treated. Accordingly the purification may be effected in parallel batteries of purifiers, which with alternate periods of a duration of about one to six hours are successively in activity and then undergoing regeneration. As described in my aforesaid application, a pair of complementary checking apparatuses, of very small capacity, may be located at the outlet from the purifier proper, said checking apparatuses containing a metal purifying agent, such as copper for example, and being alternately put in circuit with the remainder of the plant for periods of from one to several weeks.

The accompanying drawing shows diagrammatically a plant for the purification of gases and vapours derived from the distillation of starting materials such as lignite, peats or tars.

The process is assumed to be carried out in combination with the means which forms the subject of my U. S. patent application No. 205,817, filed July 14, 1927, for "process for the treatment of a metallic organic or other compound, or a gas, by a gaseous reagent serving to enter into reaction therewith" and of the French Patent No. 639,774, filed February 3, 1927, for "process and apparatus for the regeneration of metal oxides having served for the desulphurization of a gas or vapor", to which patent a patent of addition was annexed, filed August 8, 1927.

The gases and vapors derived from the pyrogenation, distillation or gasification of carbonaceous starting materials, after separation of certain products boiling above 400° C., are eventually led, for example by the branches $A^1$, $A^2$, $A^3$, $A^4$ of a pipe A, provided with cocks $a^1$, $a^2$, $a^3$, $a^4$ into parallel batteries of purifiers proper $B^1$, $B^2$, $B^3$, $B^4$, arranged to be alternately in activity or undergoing regeneration, the duration of the periods of activity varying, according to the nature of the starting materials, from one to six hours.

The purifiers $B^1$ and $B^2$ are for example in activity whilst in the batteries $B^3$ and $B^4$ the regeneration of the purifying agents is proceeding by removing the sulphur and recuperating the purifying agent.

The purified gases and vapors, before passing on to the apparatuses wherein their enrichment is effected, in the presence of catalysts, are preferably separated from traces of sulphuretted hydrogen which they may still contain, by traversing a checking purifier of small capacity $E^1$ or $E^2$, containing a reagent such as copper for example, in the form of finely divided metal or oxide mounted on a porcelain or other carrier (pumice stone or porous earth), and giving with the sulphur a sulphide stable at the reaction temperature.

With the small quantity of $H_2S$ which passes through the outlet pipes $C^1$, $C^2$, $C^3$, $C^4$ and the collecting pipe $C$ to the checking purifiers of which one, for instance $E^1$, is normally sufficient for the whole of the batteries $B^1$, $B^2$, $B^3$, $B^4$, the alternate periods of activity of $E^1$ and $E^2$ may be from one to six weeks according to the nature of the starting materials.

The operation of the plant illustrated by way of example, is as follows:—

The purifiers $B^1$, $B^2$ for example, charged with an oxide of nickel or other suitable oximetallic reagent, are in activity whilst $B^3$ and $B^4$ are undergoing regeneration. The cocks $a^1$, $a^2$, $c^1$, $c^2$ are open; $a^3$, $a^4$, $c^3$, $c^4$ are closed. The checking purifier $E^1$ for example being in service, the cocks $d^1$, $e^1$ are open; $d^2$ and $e^2$ are closed, and the checking purifier $E^2$ can be emptied and then recharged during such time.

In accordance with the invention which forms the subject of French Patent No. 639,774, mentioned above, each purifier $B^1$, $B^2$, $B^3$, $B^4$ has at its inlet end besides the pipes $A^1$, $A^2$, $A^3$, $A^4$, respectively, for the inlet of the gases and vapors to be purified and their respective cocks $a^1$, $a^2$, $a^3$, $a^4$, two outlet pipe $I^1$ $J^1$, $I^2$ $J^2$, $I^3$ $J^3$, $I^4$ $J^4$, each provided with a cock $i^1$ $j^1$, $i^2$ $j^2$, $i^3$ $j^3$, $i^4$ $j^4$ and opening into corresponding collectors I J in common connected to a vat K for the precipitation of the sulphur. These pipes serve for the evacuation of the products of the regeneration. This latter is effected as indicated hereinafter by the admission of air or of an oxidizing agent supplied by a pipe G and admitted by a pipe $G^1$, $G^2$, $G^3$, $G^4$ respectively, located at the outlet of the purifier proper, this treatment being preceded and followed by an admission of reducing gas (hydrogen or water gas for example) supplied by a pipe H and admitted by a corresponding pipe with a cock $f^1$, $f^2$, $f^3$, $f^4$ respectively, after eventually having traversed an atomic-rendering filter $F^1$, $F^2$, $F^3$, $F^4$ respectively.

When the purifiers $B^1$, $B^2$ are in activity, the cocks $i^1$, $i^2$, $j^1$, $j^2$, $f^1$, $f^2$, $g^1$, $g^2$ of the pipes other than the inlet pipes $A^1$, $A^2$ and outlet pipes $C^1$, $C^2$ are closed.

During the period of activity (of one to several hours) of the purifiers $B^1$, $B^2$, the regeneration of the oximetallic reagents in the purifiers $B^3$, $B^4$ is proceeded with. This regeneration is effected in three stages:—

1st stage: The cocks $a^3$, $a^4$, $c^3$, $c^4$ being closed, first of all the cocks $i^3$, $f^3$, $h^3$ and $i^4$, $f^4$, $h^4$ are opened.

Thus a reducing gas at a temperature of 300° C. to 400° C. is admitted by the pipe H past the cocks $h^3$ and $h^4$, at the outlet end of the apparatuses $B^3$, $B^4$, i. e. into the zone wherein the yield of sulphur is least.

At the inlet of the pipes $f^3$, $f^4$ may be provided an atomic-rendering filter $F^3$, $F^4$, i. e. a heated vessel containing a finely divided metal, nickel for example, mounted on a porcelain or other carrier which causes the hydrogen of the reducing gas to pass from the molecular or preformed state into the nascent state and thus to constitute a reaction starter.

The reducing gas, heated or not, on arriving on the zone wherein the purifying mass feebly loaded with sulphur still contains a considerable proportion of oxide, reduces the sulphides and the oxides to the metallic state, with the production of sulphuretted hydrogen and water vapor which escape by the opened pipes $I^3$, $I^4$ and pass, by the collector I, into the vat K charged with water.

This passage of gas has not only the purpose of liberating the metal, with a view to the second stage of regeneration, but also to form the $H_2S$ which, by reacting with the $SO_2$ produced in the course of the second stage, liberates the sulphur.

2nd stage: The cocks $h^3$, $f^3$, $i^3$, $h^4$, $f^4$, $i^4$ are closed and $g^3$, $g^4$, $j^3$, $j^4$ opened. Hot air or oxygen is admitted by the pipes $G^3$ and $G^4$. The metal, formed in the outlet zone oxidizes and is brought to incandescence. Thus in $B^3$ and $B^4$ are produced locally zones at an elevated temperature due to the heat disengaged by the reaction between the metal and the oxygen. The heat disengaged becomes available for starting the action of the oxygen on the sulphides present in the remainder of the apparatuses $B^3$ and $B^4$.

The sulphur dioxide and the water disengaged, pass, by the pipes $J^3$, $J^4$ and the collector J, into the vat K. On the operation being finished, the cocks $g^3$, $g^4$, $j^3$, $j^4$ are closed.

Applicant recognizes that the action of air or oxygen effects, simultaneously with the regeneration of the metal oxide purifiers, the formation of basic sulphates (NiO, $NiSO_4$ for example). If a purifier is put into service whilst containing basic sulphates, these latter would be reduced by the gases to be purified, with the disengagement of $SO_2$. The sulphur dioxide would be carried on to the catalysts where, in the presence of nickel, it would be in its turn reduced with the formation of $H_2S$ which would contaminate the catalyst.

It is therefore indispensable to destroy completely these sulphates, before replacing the respective purifiers in service. This is the object of the third stage.

3rd stage: The reducing gases are sent through the cocks $f^3$ and $f^4$, which, as above stated, may or may not be associated with atomic-rendering filters $F^3$ and $F^4$.

The sulphur dioxide gas which forms is evacuated into the pipe J, past the cocks $j^3$ and $j^4$ left open, the cocks $g^3$ and $g^4$ being closed.

Whilst the regeneration is being effected in $B^3$ and $B^4$, the purifying agents, in fulfilling their role in the apparatuses $B^1$ and $B^2$ are becoming sulphuretted. The traces of $H_2S$ retained by the gases and vapors are eliminated by the metal of the checking purifier $E^1$.

At the appropriate time by manipulating the appropriate cocks, the apparatuses $B^3$, $B^4$ can be placed in the purifying circuit, whilst regeneration is proceeded with in the apparatuses $B^1$, $B^2$.

Whereas these alternations are effected over periods of several hours variable according to the starting materials treated, the placing out of circuit of the checking purifier $E^1$ and into circuit of the purifier $E^2$ is effected only over periods variable from one to several weeks.

The copper sulphide or other sulphide which is produced in these checking apparatuses of very small capacity may be treated by any known method for the regeneration of the metal.

It is obvious that the purifiers proper $B^1$, $B^2$, $B^3$, $B^4$ may, instead of being each constituted as a single vessel as in the illustrated example, comprise, according to the above mentioned U. S. patent application No. 100,-462, three vessels connected in series, the leading vessel being more particularly intended to retain the mineral sulphur, the following vessel the liberation and retention of the organic sulphur and the third the retention of the sulphur of the $H_2S$ which is reformed in the course of the fixation of the organic sulphur. Obviously, the pipes ($I^1$, $J^1$, $I^2$, $J^2$, $I^3$, $J^3$, $I^4$, $J^4$) would have to be connected to the leading vessel, and the pipes ($F^1$, $G^1$, $F^2$, $G^2$, $F^3$, $G^3$, $F^4$) to the final vessel.

Instead of two separate collectors I J there could be in the plant described only one provided, furnished at the inlet end of each of the purifying apparatuses proper, with a single pipe for the outlet of both the $H_2S$ and the $SO_2$.

What is claimed is:

1. In a process for the purification of gases by means of purifying material adapted to form compounds with the impurities in said gases, the method of regenerating a contaminated purifying agent by subjecting said contaminated agent first to the action of a reducing gas, then to the action of a hot oxygen containing gas, and then to the action of a reducing gas.

2. In a process for the purification of gases by means of purifying materials adapted to form sulphides with the sulphur in said gases, the method of regenerating the contaminated purifying material which consists in first partially decomposing the sulphides by the action of a reducing gas, then oxidizing the purifying material, and then subjecting the oxidized materials to the action of a reducing gas.

3. In a process for purification of gases by nickel-containing substances capable of forming sulphides with the sulphur in said gases, the method of regenerating contaminated purifying material which consists in first partially decomposing the sulphides by a reducing gas, then oxidizing the material by subjecting it to the action of hot air, and then further subjecting the material to the action of a reducing gas.

4. In a process for the purification of gases by means of purifying materials adapted to form sulphides with the sulphur in said gases, the method of regenerating the contaminated purifying material which consists in first partially decomposing the sulphides by the action of a reducing gas, then subjecting the purifying material to an oxidizing gas and employing the heat generated by oxidation of the desulphurized material to decompose the remaining sulphides, and then subjecting the material to the action of a reducing gas.

In testimony whereof I have signed this specification.

ALFRED JOSEPH.